United States Patent
Shan et al.

(10) Patent No.: US 10,966,061 B2
(45) Date of Patent: Mar. 30, 2021

(54) MULTICAST SERVICE TRANSMISSION METHOD AND DEVICE

(71) Applicant: Huawei Technologies Co., Ltd., Shenzhen (CN)

(72) Inventors: Baokun Shan, Beijing (CN); Yinghui Yu, Beijing (CN); Tong Ji, Beijing (CN); Li Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 16/368,085

(22) Filed: Mar. 28, 2019

(65) Prior Publication Data

US 2019/0222970 A1 Jul. 18, 2019

Related U.S. Application Data

(63) Continuation of application No. PCT/CN2016/100942, filed on Sep. 29, 2016.

(51) Int. Cl.
*H04W 4/06* (2009.01)
*H04W 8/04* (2009.01)
(Continued)

(52) U.S. Cl.
CPC ............ *H04W 4/06* (2013.01); *H04L 1/08* (2013.01); *H04W 4/00* (2013.01); *H04W 8/04* (2013.01);
(Continued)

(58) Field of Classification Search
None
See application file for complete search history.

(56) References Cited

U.S. PATENT DOCUMENTS 9,338,715 B1 * 5/2016 Sevindik ............... H04W 76/11
2010/0008269 A1 1/2010 Chun et al.
(Continued)

FOREIGN PATENT DOCUMENTS

| CN | 1756414 A | 4/2006 |
| CN | 101370156 A | 2/2009 |

(Continued)

OTHER PUBLICATIONS

"3rd Generation Partnership Project; Technical Specification Group Services and System Aspects; Multimedia Broadcast/Multicast Service (MBMS); Architecture and functional description (Release 14)," 3GPP TS 23.246 V14.0.0 , Sep. 2016, 76 pages.
(Continued)

*Primary Examiner* — Otis L Thompson, Jr.
(74) *Attorney, Agent, or Firm* — Slater Matsil, LLP

(57) ABSTRACT

A multicast service transmission method and a device, the method comprising determining, by a core network device, a coverage requirement of a to-be-transmitted multicast service, transmitting, by the core network device, the coverage requirement to an access network device, where the coverage requirement is used to determine a transmission parameter used to transmit the multicast service to a terminal device, receiving, by the access network device, the coverage requirement, determining, by the access network device according to the coverage requirement, the transmission parameter, and transmitting, by the access network device, the multicast service to the terminal device according to the transmission parameter.

18 Claims, 12 Drawing Sheets

(51) Int. Cl.
  *H04W 28/22* (2009.01)
  *H04W 16/18* (2009.01)
  *H04W 88/08* (2009.01)
  *H04L 1/08* (2006.01)
  *H04W 72/00* (2009.01)
  *H04W 4/00* (2018.01)

(52) U.S. Cl.
  CPC ........... *H04W 16/18* (2013.01); *H04W 28/22* (2013.01); *H04W 72/005* (2013.01); *H04W 88/08* (2013.01)

(56) References Cited

U.S. PATENT DOCUMENTS

| | | | |
|---|---|---|---|
| 2015/0078241 A1* | 3/2015 | Xu | H04L 12/189 370/312 |
| 2016/0087810 A1 | 3/2016 | Zhang et al. | |
| 2019/0174270 A1 | 6/2019 | Shan et al. | |
| 2020/0280390 A1* | 9/2020 | Bagheri | H04L 1/08 |

FOREIGN PATENT DOCUMENTS

| | | |
|---|---|---|
| CN | 101627611 A | 1/2010 |
| CN | 108702592 A | 10/2018 |
| EP | 1515575 A1 | 3/2005 |
| EP | 3487193 A1 | 5/2019 |

OTHER PUBLICATIONS

"3rd Generation Partnership Project; Technical Specification Group Radio Access Network; Evolved Universal Terrestrial Radio Access (E-UTRA); Multiplexing and channel coding (Release 13)," 3GPP TS 36.212 V13.2.0, Jun. 2016, 140 pages.

"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321 V13.2.0, Jun. 2016, 91 pages.

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331 V13.2.0, Jun. 2016, 623 pages.

* cited by examiner

CONT. FROM FIG. 4A

CONT. FROM FIG. 4A

CONT. FROM FIG. 4A

The MME determines a coverage requirement of the multicast service based on the use grant information, and transmits an MBMS session start request message to an MCE, where the MBMS session start request message includes the coverage requirement of the multicast service and the list of cells in which multicast is performed for the multicast service The MCE transmits an SC-PTM indication and the coverage requirement of the multicast service to a base station

CONT. FROM FIG. 4A

The base station determines, based on the coverage requirement of the multicast service, a coverage level or a transmission parameter used to transmit the multicast service to the UE by the base station

CONT. FROM FIG. 4A

Deliver a parameter configuration

FIG. 4B

MULTICAST SERVICE TRANSMISSION METHOD AND DEVICE

CROSS-REFERENCE TO RELATED APPLICATIONS

This application is a continuation of International Application No. PCT/CN2016/100942, filed on Sep. 29, 2016, the disclosure of which is hereby incorporated by reference in its entirety.

TECHNICAL FIELD

The present application relates to the communications field, and in particular, to a multicast service transmission method and a device.

BACKGROUND

Currently, the 3rd generation partnership project (3GPP) standard is based on a cellular network, and a new air interface is designed to carry an internet of things (IoT) service by using a characteristic of a narrowband technology. Such IoT is referred to as the narrowband internet of things (NB-IoT). Compared with a conventional cellular network, an NB-IoT network is characterized by a smaller data packet generated by a service, a longer data transmission period, and lower costs of a terminal device connected to an NB-IoT base station. There may be a large quantity of terminal devices connected to one NB-IoT base station, to implement mass deployment of the terminal devices.

In the NB-IoT, a multicast transmission solution needs to be designed based on a single cell point to multipoint (SC-PTM) technology in long term evolution (LTE), to reduce resource overheads when a network performs a service having a multicast feature, for example, software upgrade. Based on characteristics of the service and the terminal device of the NB-IoT network, compared with the LTE, it is more difficult to ensure reliability and efficiency of an internet protocol (IP) data packet in multicast transmission of a radio access network in the NB-IoT. In an aspect, a multicast service is targeted at a plurality of terminal devices, and a base station does not learn of service subscription information of the terminal devices. Therefore, if a transmission parameter is directly determined by the base station, a coverage level used by the base station may not match actual needs of the terminal devices. For example, if a coverage level selected by the base station is excessively low, when there is a poorly covered terminal device in a cell, a multicast transmission success rate of the poorly covered terminal device is relatively low, and consequently the base station needs to retransmit service data to the terminal device. In addition, the poorly covered terminal device also consumes a relatively large quantity of unicast resources, and consequently overall resource consumption is relatively large. Because a large quantity of resources are consumed to transmit a multicast service with a high coverage level, if a coverage level selected by the base station is relatively high, when a terminal device that actually subscribes to the multicast service is relatively well covered, a large quantity of resources are wasted. In another aspect, the NB-IoT uses a relatively low modulation and coding scheme (MCS), and uses a very small transport block size (TBS) at a physical layer, to reduce terminal device costs. Therefore, for a same transport-layer or network-layer data packet on which multicast needs to be performed, for example, an IP data packet, the NB-IoT needs to use more transport blocks (TB) on a physical downlink shared channel (PDSCH) for carrying. If one or more TBs are incorrectly transmitted, the entire IP data packet is to be retransmitted. Consequently, a TB that is correctly received in the IP data packet also needs to be retransmitted, and network resources are wasted.

SUMMARY

Embodiments of the present application provide a multicast service transmission method and a device, to improve a transmission success rate of an NB-IoT multicast service and reduce waste of network resources.

According to a first aspect, a multicast service transmission method is provided, including determining, by a core network device, a coverage requirement of a to-be-transmitted multicast service, and transmitting, by the core network device, the coverage requirement to an access network device, where the coverage requirement is used to determine a coverage level or a transmission parameter used by the access network device to transmit the multicast service to a terminal device. Different coverage requirements may be corresponding to different coverage levels or transmission parameters. Therefore, the access network device may determine, based on the coverage requirement received from a core network, the coverage level or the transmission parameter actually used in the current multicast service transmission. This avoids problems of a low transmission success rate and resource waste by preventing a base station from selecting an improper coverage level or transmission parameter.

In a possible design, the transmission parameter includes an index of a coverage level corresponding to the multicast service, or a quantity of retransmission times of the multicast service on a control channel or a shared channel of a physical layer. Different coverage levels may be corresponding to different transmission parameters. The quantity of retransmission times may be, for example, 256 or 512. When the multicast service is retransmitted for a plurality of times, a reception success rate of the multicast service can be improved.

In a possible design, the core network device includes a broadcast/multicast service center BM-SC, and the determining, by a core network device, a coverage requirement of a to-be-transmitted multicast service includes determining, by the BM-SC, the coverage requirement of the multicast service based on a correspondence, provided by a third-party server, between a service type of the multicast service and the coverage requirement of the multicast service, or determining, by the BM-SC, the coverage requirement of the multicast service based on a service type of the multicast service provided by a third-party server, and a correspondence, preconfigured by the BM-SC, between a service type of the multicast service and the coverage requirement of the multicast service. In other words, the core network device may preconfigure a correspondence between a service type and a coverage requirement of a multicast service, or the third-party server may provide a correspondence between a service type and a coverage requirement of a multicast service for the core network device. For example, a road lamp has relatively good coverage, and a coverage level of a road lamp software upgrade service may be relatively low, water and electricity meters in a basement have relatively poor coverage, and a coverage level of a water and electricity meter upgrade service may be relatively high.

In a possible design, the core network device includes the BM-SC, and the access network device includes a base station, and the transmitting, by the core network device, the coverage requirement to an access network device includes transmitting, by the BM-SC, the coverage requirement to the base station by using a mobility management entity and an MCE. In this way, the base station may determine the coverage level or the transmission parameter based on the coverage requirement received from a core network. This avoids problems of a low transmission success rate and resource waste by preventing the base station from selecting an improper coverage level or transmission parameter.

In a possible design, the core network device includes a home subscriber server HSS, and the access network device includes a base station, and the transmitting, by the core network device, the coverage requirement to an access network device includes transmitting, by the HSS, the coverage requirement to the base station by using a mobility management entity and an MCE. In this way, coverage level use permission information of the multicast service or a multicast service provider is obtained through interaction between the mobility management entity and the HSS, and the coverage requirement is determined and is transmitted to the base station by using the MCE. In this way, the base station may determine the coverage level or the transmission parameter based on the coverage requirement received from a core network. This avoids problems of a low transmission success rate and resource waste by preventing the base station from selecting an improper coverage level or transmission parameter.

According to a second aspect, a multicast service transmission method is provided, including receiving, by an access network device, a coverage requirement transmitted by a core network device, determining, by the access network device based on the coverage requirement, a coverage level or a transmission parameter used by the access network device to transmit a multicast service to a terminal device, and transmitting, by the access network device, the multicast service to the terminal device based on the coverage level or the transmission parameter. Therefore, the access network device may determine, based on the coverage requirement received from a core network, the coverage level or the transmission parameter actually used in the current multicast service transmission. This avoids problems of a low transmission success rate and resource waste by preventing a base station from selecting an improper coverage level or transmission parameter.

In a possible design, the transmission parameter includes an index of a coverage level corresponding to the multicast service, or a quantity of retransmission times of the multicast service on a control channel or a shared channel of a physical layer.

According to a third aspect, a multicast service transmission method is provided, including transmitting, by a base station, all or some of radio link layer control protocol data control units RLC PDUs of a multicast service to a terminal device at a radio link layer control protocol RLC layer for one or more times, receiving, by the base station, feedback information transmitted by the terminal device, where the feedback information is used to indicate an unsuccessfully received RLC PDU to the base station, and retransmitting, by the base station, the unsuccessfully received RLC PDU to the terminal device. In this way, after completely transmitting all or some of the RLC PDUs of the multicast service, the base station may retransmit the unsuccessfully received RLC PDU to the terminal device in a unicast manner based on the feedback information of the terminal device. This can increase a transmission success rate of an IP data packet on a base station side, and can also avoid waste of network resources caused by retransmission of the entire IP data packet when a few TBs are incorrectly transmitted.

In a possible design, before the transmitting, by a base station, all or some of RLC PDUs of a multicast service to a terminal device at an RLC layer for one or more times, the method further includes transmitting, by the base station, configuration information to the terminal device, where the configuration information includes at least one of a quantity of retransmission times of all or some of the RLC PDUs of the multicast service at the RLC layer, first indication information, and a first timer, the first indication information is used to indicate whether all or some of the RLC PDUs support the terminal device in feeding back and retransmitting in a unicast manner the unsuccessfully received RLC PDU at the RLC layer, and the first timer is used to indicate duration in which the base station receives the feedback information within a preset time. The quantity of retransmission times is a quantity of times that the base station transmits all or some of the RLC PDUs to the terminal device for a plurality of times. The configuration information transmitted by the base station to the terminal device may be the same or different for different multicast services. The duration in which the base station receives the feedback information within the preset time is duration in which the base station caches all or some of the RLC PDUs, so that the base station retransmits the unsuccessfully received RLC PDU to the terminal device within the preset time.

In a possible design, when the configuration information includes the first timer, each RLC PDU is corresponding to one first timer, and the transmitting, by a base station, some of RLC PDUs of a multicast service to a terminal device at an RLC layer for one or more times includes transmitting, by the base station, any RLC PDU to the terminal device at the RLC layer for one or more times, and continuing to transmit a next RLC PDU to the terminal device for one or more times after duration of the first timer. In this way, the base station does not need to cache all of the RLC PDUs after transmitting all of the RLC PDUs, and the terminal device no more needs to cache all of the RLC PDUs after receiving all of the RLC PDUs. This reduces storage costs of the base station and the terminal device.

In a possible design, each RLC PDU header includes a first field, and the first field is used to indicate that a currently transmitted RLC PDU is retransmitted for an $N^{th}$ time, and N is a positive integer, or the first field is used to indicate whether a currently transmitted RLC PDU is retransmitted for a last time, or downlink control information transmitted on a physical downlink control channel PDCCH of an RLC PDU includes indication information used to indicate whether the currently transmitted RLC PDU is transmitted for a last time. In this way, for the terminal device, assuming that the terminal device successfully receives all or some of the RLC PDUs transmitted at a given retransmission time, when a terminal receives an RLC PDU transmitted next time, if an RLC PDU header still shows retransmission of all or some of the RLC PDUs that are previously transmitted, the terminal may continue to receive, after a period of time, all or some of the RLC PDUs that are retransmitted by the base station for the last time, to achieve an effect of power saving.

In a possible design, a last RLC PDU transmitted by the base station includes indication information used to indicate that all of the RLC PDUs of the multicast service are transmitted. For example, an indication bit indicating completion of all retransmissions may be reserved in an RLC PDU, and completion of transmitting all of the RLC PDUs is indicated in a last RLC PDU of transmission performed for a last time, so that the terminal device learns of retransmission completion of the multicast service. Alternatively, a last RLC PDU in all of the RLC PDUs of the multicast service that are retransmitted by the base station each time includes indication information used to indicate that all of the RLC PDUs of the multicast service are transmitted for an $N^{th}$ time, so that UE may determine, with reference to the quantity of retransmission times in the configuration information, whether all of the RLC PDUs are transmitted.

In a possible design, the transmitting, by the base station, configuration information to the terminal device includes broadcasting, by the base station, system information to the terminal device, where the system information includes the configuration information, transmitting, by the base station, the configuration information to the terminal device on a Multimedia Broadcast Multicast Service MBMS control channel SC-MCCH, transmitting, by the base station, the configuration information to the terminal device on a physical downlink control channel PDCCH of an SC-MCCH, or transmitting, by the base station, the configuration information to the terminal device on a PDCCH of an MBMS traffic channel SC-MTCH.

According to a fourth aspect, a multicast service transmission method is provided, including receiving, by a terminal device, all or some of radio link layer control protocol data control units RLC PDUs of a multicast service that are transmitted by a base station at a radio link layer control protocol RLC layer for one or more times, transmitting, by the terminal device, feedback information to the base station, where the feedback information is used to indicate an unsuccessfully received RLC PDU to the base station, and receiving, by the terminal device, the unsuccessfully received RLC PDU retransmitted by the base station. After the multicast service is transmitted, unicast retransmission of the RLC layer is performed on a base station side. This can increase a transmission success rate of a UDP/IP data packet on the base station side, and also resolves a problem of waste of network resources caused by retransmission of the entire UDP/IP data packet when a few TBs are incorrectly transmitted.

In a possible design, before the receiving, by a terminal device, all or some of RLC PDUs of a multicast service that are transmitted by a base station at an RLC layer for one or more times, the method further includes receiving, by the terminal device, configuration information transmitted by the base station, where the configuration information includes at least one of a quantity of retransmission times of all or some of the RLC PDUs of the multicast service at the RLC layer, first indication information, and a first timer, the first indication information is used to indicate whether all or some of the RLC PDUs support the terminal device in feeding back and retransmitting in a unicast manner the unsuccessfully received RLC PDU at the RLC layer, and the first timer is used to indicate duration in which the base station receives the feedback information within a preset time.

In a possible design, the receiving, by a terminal device, some of RLC PDUs of a multicast service that are transmitted by a base station at an RLC layer for one or more times includes completely receiving, by the terminal device, any RLC PDU, of the multicast service, that is transmitted by the base station at the RLC layer for one or more times, and after duration of a second timer, receiving a next RLC PDU transmitted by the base station for one or more times, where the duration of the second timer is the same as duration of the first timer.

In a possible design, each RLC PDU header includes a first field, and the first field is used to indicate that a currently transmitted RLC PDU is retransmitted for an $N^{th}$ time, and N is a positive integer greater than or equal to 1, or the first field is used to indicate whether a currently transmitted RLC PDU is retransmitted for a last time, or downlink control information transmitted on a physical downlink control channel PDCCH of an RLC PDU includes indication information used to indicate whether the currently transmitted RLC PDU is retransmitted for a last time.

In a possible design, a last RLC PDU received by the terminal device includes indication information used to indicate that all of the RLC PDUs of the multicast service are transmitted, or a last RLC PDU in all of the RLC PDUs of the multicast service that are retransmitted by the base station each time includes indication information used to indicate that all of the RLC PDUs of the multicast service are transmitted for an $N^{th}$ time.

In a possible design, the receiving, by the terminal device, configuration information transmitted by the base station includes receiving, by the terminal device, system information broadcast by the base station, where the system information includes the configuration information, receiving, by the terminal device, the configuration information transmitted by the base station on a Multimedia Broadcast Multicast Service MBMS control channel SC-MCCH, receiving, by the terminal device, the configuration information transmitted by the base station on a physical downlink control channel PDCCH of an SC-MCCH, or receiving, by the terminal device, the configuration information transmitted by the base station on a PDCCH of an MBMS traffic channel SC-MTCH.

According to a fifth aspect, a core network device is provided, including a processing module, configured to determine a coverage requirement of a to-be-transmitted multicast service, and a communications module, configured to transmit the coverage requirement determined by the processing module to an access network device, where the coverage requirement is used to determine a coverage level or a transmission parameter used by the access network device to transmit the multicast service to a terminal device.

In a possible design, the transmission parameter includes an index of a coverage level corresponding to the multicast service, or a quantity of retransmission times of the multicast service on a control channel or a shared channel of a physical layer.

In a possible design, the processing module is specifically configured to determine the coverage requirement of the multicast service based on a correspondence, provided by a third-party server, between a service type of the multicast service and the coverage requirement of the multicast service, or determine the coverage requirement of the multicast service based on a service type of the multicast service provided by a third-party server, and a correspondence, preconfigured by a BM-SC, between a service type of the multicast service and the coverage requirement of the multicast service.

In a possible design, the communications module is specifically configured to transmit the coverage requirement determined by the processing module to a base station by using a mobility management entity and an MCE.

In a possible design, a receiving module is configured to receive a coverage requirement transmitted by an access network device, a processing module is configured to determine, based on the coverage requirement received by the receiving module, a coverage level or a transmission parameter used by the access network device to transmit a multicast service to a terminal device, and a communications module is configured to transmit the multicast service to the terminal device based on the coverage level or the transmission parameter determined by the processing module.

In a possible design, the transmission parameter includes an index of a coverage level corresponding to the multicast service, or a quantity of retransmission times of the multicast service on a control channel or a shared channel of a physical layer.

According to a sixth aspect, an access network device is provided, including a receiving module, configured to receive a coverage requirement transmitted by a core network device, a processing module, configured to determine, based on the coverage requirement received by the receiving module, a coverage level or a transmission parameter used by the access network device to transmit a multicast service to a terminal device, and a communications module, configured to transmit the multicast service to the terminal device based on the coverage level or the transmission parameter determined by the processing module.

In a possible design, the transmission parameter includes an index of a coverage level corresponding to the multicast service, or a quantity of retransmission times of the multicast service on a control channel or a shared channel of a physical layer.

According to a seventh aspect, a base station is provided, including a transmission module, configured to transmit all or some of radio link layer control protocol data control units RLC PDUs of a multicast service to a terminal device at a radio link layer control protocol RLC layer for one or more times, and a receiving module, configured to receive feedback information transmitted by the terminal device, where the feedback information is used to indicate, to the base station, an unsuccessfully received RLC PDU that is transmitted by the communications module, and the transmission module is further configured to retransmit the unsuccessfully received RLC PDU to the terminal device.

In a possible design, the transmission module is further configured to transmit configuration information to the terminal device, where the configuration information includes at least one of a quantity of retransmission times of all or some of the RLC PDUs of the multicast service at the RLC layer, first indication information, and a first timer, the first indication information is used to indicate whether all or some of the RLC PDUs support the terminal device in feeding back and retransmitting in a unicast manner the unsuccessfully received RLC PDU at the RLC layer, and the first timer is used to indicate duration in which the base station receives the feedback information within a preset time.

In a possible design, the transmission module is configured to transmit any RLC PDU to the terminal device at the RLC layer for one or more times, and continue to transmit a next RLC PDU to the terminal device for one or more times after duration of the first timer.

In a possible design, each RLC PDU header includes a first field, and the first field is used to indicate that a currently transmitted RLC PDU is retransmitted for an $N^{th}$ time, and N is a positive integer greater than or equal to 1, or the first field is used to indicate whether a currently transmitted RLC PDU is retransmitted for a last time, or downlink control information transmitted on a physical downlink control channel PDCCH of an RLC PDU includes indication information used to indicate whether the currently transmitted RLC PDU is transmitted for a last time.

In a possible design, a last RLC PDU transmitted when the transmission module is configured to transmit all of the RLC PDUs includes indication information used to indicate that all of the RLC PDUs of the multicast service are transmitted, or when the communications module is configured to transmit all of the RLC PDUs, a last RLC PDU in all of the RLC PDUs of the multicast service that are retransmitted each time includes indication information used to indicate that all of the RLC PDUs of the multicast service are transmitted for an $N^{th}$ time.

In a possible design, the transmission module is configured to broadcast system information to the terminal device, where the system information includes the configuration information, transmit the configuration information to the terminal device on a Multimedia Broadcast Multicast Service MBMS control channel SC-MCCH, transmit the configuration information to the terminal device on a physical downlink control channel PDCCH of an SC-MCCH, or transmit the configuration information to the terminal device on a PDCCH of an MBMS traffic channel SC-MTCH.

According to an eighth aspect, a terminal device is provided, including a receiving module, configured to receive all or some of radio link layer control protocol data control units RLC PDUs of a multicast service that are transmitted by a base station at a radio link layer control protocol RLC layer for one or more times, and a transmission module, configured to transmit feedback information to the base station, where the feedback information is used to indicate, to the base station, an unsuccessfully received RLC PDU that is transmitted by a communications module, and the receiving module is further configured to receive the unsuccessfully received RLC PDU retransmitted by the base station.

In a possible design, the receiving module is further configured to receive configuration information transmitted by the base station, where the configuration information includes at least one of a quantity of retransmission times of all or some of the RLC PDUs of the multicast service at the RLC layer, first indication information, and a first timer, the first indication information is used to indicate whether all or some of the RLC PDUs support the terminal device in feeding back and retransmitting in a unicast manner the unsuccessfully received RLC PDU at the RLC layer, and the first timer is used to indicate duration in which the base station receives the feedback information within a preset time.

In a possible design, the receiving module is configured to completely receive any RLC PDU, of the multicast service, that is transmitted by the base station at the RLC layer for one or more times, and after duration of a second timer, receive a next RLC PDU transmitted by the base station for one or more times, where the duration of the second timer is the same as duration of the first timer.

In a possible design, each RLC PDU header includes a first field, and the first field is used to indicate that a currently transmitted RLC PDU is retransmitted for an $N^{th}$ time, and N is a positive integer greater than or equal to 1, or the first field is used to indicate whether a currently transmitted RLC PDU is retransmitted for a last time, or downlink control information transmitted on a physical downlink control channel PDCCH of an RLC PDU includes indication information used to indicate whether the currently transmitted RLC PDU is retransmitted for a last time.

In a possible design, a last RLC PDU received when the receiving module is configured to receive all of the RLC PDUs includes indication information used to indicate that all of the RLC PDUs of the multicast service are transmitted, or when the receiving module is configured to receive all of the RLC PDUs, a last RLC PDU in all of the RLC PDUs of the multicast service that are retransmitted each time includes indication information used to indicate that all of the RLC PDUs of the multicast service are transmitted for an $N^{th}$ time.

In a possible design, the receiving module is configured to receive system information broadcast by the base station, where the system information includes the configuration information, receive the configuration information transmitted by the base station on a Multimedia Broadcast Multicast Service MBMS control channel SC-MCCH, receive the configuration information transmitted by the base station on a physical downlink control channel PDCCH of an SC-MCCH, or receive the configuration information transmitted by the base station on a PDCCH of an MBMS traffic channel SC-MTCH.

According to a ninth aspect, a core network device is provided, including a processor, configured to determine a coverage requirement of a to-be-transmitted multicast service, and a transceiver, configured to transmit the coverage requirement obtained from the processor to an access network device, where the coverage requirement is used to determine a coverage level or a transmission parameter used by the access network device to transmit the multicast service to a terminal device.

In a possible design, the transmission parameter includes an index of a coverage level corresponding to the multicast service, or a quantity of retransmission times of the multicast service on a control channel or a shared channel of a physical layer.

In a possible design, the processor is configured to determine the coverage requirement of the multicast service based on a correspondence, provided by a third-party server, between a service type of the multicast service and the coverage requirement of the multicast service, or determine the coverage requirement of the multicast service based on a service type of the multicast service provided by a third-party server, and a correspondence, preconfigured by a BM-SC, between a service type of the multicast service and the coverage requirement of the multicast service.

In a possible design, the transceiver is configured to transmit the coverage requirement obtained from the processor to a base station by using a mobility management entity and an MCE.

According to a tenth aspect, an access network device is provided, including a receiver, configured to receive a coverage requirement transmitted by a core network device, and a processor, configured to determine, based on the coverage requirement obtained from the receiver, a coverage level or a transmission parameter used by the access network device to transmit a multicast service to a terminal device, so that the access network device transmits the multicast service to the terminal device based on the coverage level or the transmission parameter.

In a possible design, the transmission parameter includes an index of a coverage level corresponding to the multicast service, or a quantity of retransmission times of the multicast service on a control channel or a shared channel of a physical layer.

According to an eleventh aspect, a base station is provided, including a transceiver, configured to transmit all or some of radio link layer control protocol data control units RLC PDUs of a multicast service to a terminal device at a radio link layer control protocol RLC layer for one or more times, and a receiver, configured to receive feedback information transmitted by the terminal device, where the feedback information is used to indicate an unsuccessfully received RLC PDU to the base station, and the transceiver is further configured to retransmit the unsuccessfully received RLC PDU to the terminal device.

In a possible design, the transceiver is further configured to transmit configuration information to the terminal device, where the configuration information includes at least one of a quantity of retransmission times of all or some of the RLC PDUs of the multicast service at the RLC layer, first indication information, and a first timer, the first indication information is used to indicate whether all or some of the RLC PDUs support the terminal device in feeding back and retransmitting in a unicast manner the unsuccessfully received RLC PDU at the RLC layer, and the first timer is used to indicate duration in which the base station receives the feedback information within a preset time.

In a possible design, when the configuration information includes the first timer, each RLC PDU is corresponding to one first timer, and the transceiver is configured to transmit any RLC PDU to the terminal device at the RLC layer for one or more times, and continue to transmit a next RLC PDU to the terminal device for one or more times after duration of the first timer.

In a possible design, each RLC PDU header includes a first field, and the first field is used to indicate that a currently transmitted RLC PDU is retransmitted for an $N^{th}$ time, and N is a positive integer, or the first field is used to indicate whether a currently transmitted RLC PDU is retransmitted for a last time, or downlink control information transmitted on a physical downlink control channel PDCCH of an RLC PDU includes indication information used to indicate whether the currently transmitted RLC PDU is transmitted for a last time.

In a possible design, a last RLC PDU transmitted by the transceiver includes indication information used to indicate that all of the RLC PDUs of the multicast service are transmitted, or a last RLC PDU in all of the RLC PDUs of the multicast service that are retransmitted by the transceiver each time includes indication information used to indicate that all of the RLC PDUs of the multicast service are transmitted for an $N^{th}$ time.

In a possible design, the transceiver is configured to broadcast system information to the terminal device, where the system information includes the configuration information, transmit, by the base station, the configuration information to the terminal device on a Multimedia Broadcast Multicast Service MBMS control channel SC-MCCH, transmit, by the base station, the configuration information to the terminal device on a physical downlink control channel PDCCH of an SC-MCCH, or transmit, by the base station, the configuration information to the terminal device on a PDCCH of an MBMS traffic channel SC-MTCH.

According to a twelfth aspect, a terminal device is provided, including a receiver, configured to receive all or some of radio link layer control protocol data control units RLC PDUs are of a multicast service that are transmitted by a base station at a radio link layer control protocol RLC layer for one or more times, and a transceiver, configured to transmit feedback information to the base station, where the feedback information is used to indicate an unsuccessfully received RLC PDU to the base station, and the receiver is configured to receive the unsuccessfully received RLC PDU retransmitted by the base station.

In a possible design, before the terminal device receives all or some of the RLC PDUs of the multicast service that are transmitted by the base station at the RLC layer for one or more times, the receiver is further configured to receive configuration information transmitted by the base station, where the configuration information includes at least one of a quantity of retransmission times of all or some of the RLC PDUs of the multicast service at the RLC layer, first indication information, and a first timer, the first indication information is used to indicate whether all or some of the RLC PDUs support the terminal device in feeding back and retransmitting in a unicast manner the unsuccessfully received RLC PDU at the RLC layer, and the first timer is used to indicate duration in which the base station receives the feedback information within a preset time.

In a possible design, the receiver is configured to completely receive any RLC PDU, of the multicast service, that is transmitted by the base station at the RLC layer for one or more times, and after duration of a second timer, receive a next RLC PDU transmitted by the base station for one or more times, where the duration of the second timer is the same as duration of the first timer.

In a possible design, each RLC PDU header transmitted by the transceiver includes a first field, and the first field is used to indicate that a currently transmitted RLC PDU is retransmitted for an $N^{th}$ time, and N is a positive integer greater than or equal to 1, or the first field is used to indicate whether a currently transmitted RLC PDU is retransmitted for a last time, or downlink control information transmitted on a physical downlink control channel PDCCH of an RLC PDU includes indication information used to indicate whether the currently transmitted RLC PDU is retransmitted for a last time.

In a possible design, a last RLC PDU received by the receiver includes indication information used to indicate that all of the RLC PDUs of the multicast service are transmitted, or a last RLC PDU in all of the RLC PDUs of the multicast service that are repeatedly received by the receiver each time includes indication information used to indicate that all of the RLC PDUs of the multicast service are transmitted for an $N^{th}$ time.

In a possible design, the receiver is configured to receive system information broadcast by the base station, where the system information includes the configuration information, the receiver is configured to receive the configuration information transmitted by the base station on a Multimedia Broadcast Multicast Service MBMS control channel SC-MCCH, the receiver is configured to receive the configuration information transmitted by the base station on a physical downlink control channel PDCCH of an SC-MCCH, or the receiver is configured to receive the configuration information transmitted by the base station on a PDCCH of an MBMS traffic channel SC-MTCH.

Therefore, the base station of the access network device may determine, based on the coverage requirement received from a core network, the coverage level or the transmission parameter actually used in the current multicast service transmission. This avoids problems of a low transmission success rate and resource waste by preventing the base station from selecting an improper coverage level or transmission parameter. After completely transmitting the multicast service, the base station may perform unicast retransmission of the RLC layer on a base station side. This can increase a transmission success rate of a UDP/IP data packet on the base station side, and also resolves a problem of waste of network resources caused by retransmission of the entire UDP/IP data packet when a few TBs are incorrectly transmitted.

BRIEF DESCRIPTION OF THE DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

FIGS. 4A and 4B are a schematic flowchart of a multicast service transmission method according to an embodiment of the present application;

DETAILED DESCRIPTION OF ILLUSTRATIVE EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

The embodiments of the present application may be applied to wireless communications systems requiring a terminal device characterizing low complexity and low power consumption, for example, an IoT communications system. For example, the embodiments of the present application may be applied to a multicast scenario in an NB-IoT communications system.

Figure 1:
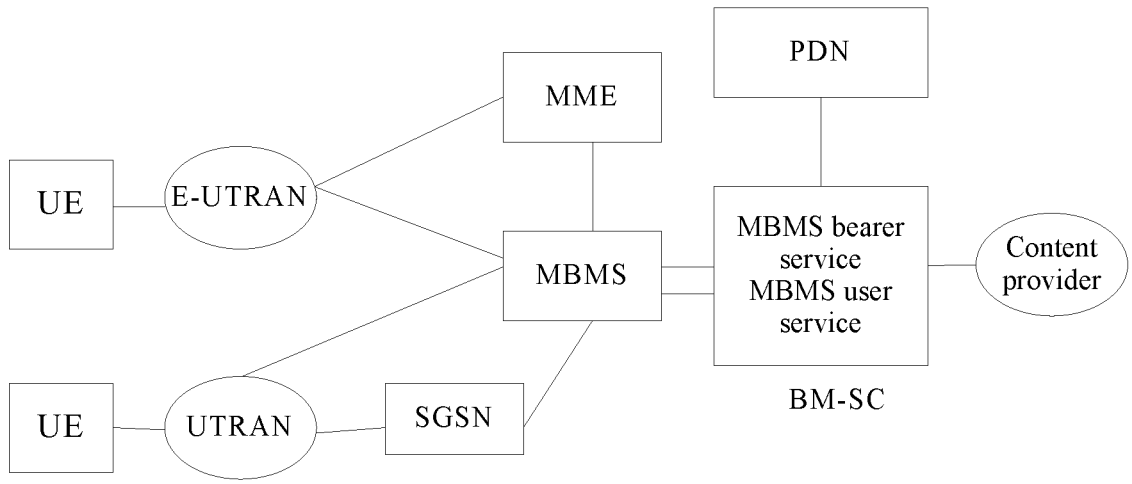
FIG. 1 is a schematic structural diagram of a network according to an embodiment of the present application.

As shown in FIG. 1, a network architecture in the embodiments of the present application may include a terminal device, an access network device, and a core network device. The terminal device may be user equipment (UE). An access network may be an evolved Universal Mobile Telecommunications System (UMTS) terrestrial radio access network (E-UTRAN) or a UTRAN, including an evolved NodeB (eNB). The core network device may include a mobility management entity (MME), a broadcast/multicast service center (BM-SC), a Multimedia Broadcast Multicast Service (MBMS), an MBMS coordination entity (MCE), and the like. The BM-SC is responsible for managing an MBMS bearer, activating/releasing a temporary mobile group identity (TMGI) of a service, and the like. The MCE may be configured to determine to use a multicast-broadcast single-frequency network (MBSFN) mode or an SC-PTM mode for a multicast service.

On one hand, for a prior-art problem of resource waste caused by decrease of transmission reliability when a base station cannot determine a proper coverage level for transmitting a multicast service, in the embodiments of the present application, during signaling transmission from a BM-SC to a base station, a core network determines a coverage level or a transmission parameter of a multicast service, and transmits the determined coverage level or transmission parameter to the base station by using related signaling, so that the base station can use the proper coverage level or transmission parameter to transmit the multicast service, thereby reducing waste of multicast resources on a basis of enhancing coverage of the multicast service.

On the other hand, for a problem that when an IP data packet is transmitted in NB-IoT, if one or several TBs are unsuccessfully transmitted, the entire IP data packet is retransmitted and additional retransmission and reception overheads are caused, in the embodiments of the present application, when transmitting an IP data packet, an access network device segments the IP data packet into several RLC PDUs at an RLC layer, receives feedback information of a terminal device after transmitting the several RLC PDUs, and retransmits an unsuccessfully received RLC PDU to the terminal device with no need to retransmit the entire IP data packet, to reduce resource overheads caused by unicast retransmission after a transmission error.

Figure 2:
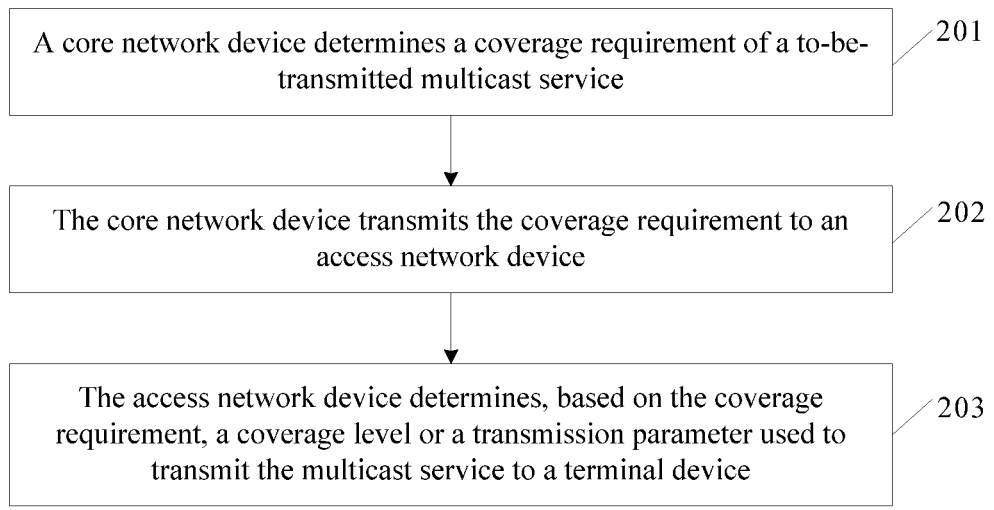
FIG. 2 is a schematic flowchart of a multicast service transmission method according to an embodiment of the present application.

In the following, for the prior-art problem of resource waste caused by decrease of transmission reliability when a base station cannot determine a proper coverage level for transmitting a multicast service, an embodiment of the present application provides a multicast service transmission method. As shown in FIG. 2, the method includes the following steps.

201. A core network device determines a coverage requirement of a to-be-transmitted multicast service.

For example, the coverage requirement of the to-be-transmitted multicast service may be determined by using a characteristic of the current transmission service in interaction information between a BM-SC in a core network and a third-party server. The coverage requirement is used to represent a coverage enhancement degree when a base station transmits the multicast service to a terminal device.

202. The core network device transmits the coverage requirement to an access network device.

The BM-SC may transmit the coverage requirement to the base station by using a mobility management entity and an MCE. The coverage requirement may be a coverage level index or a coverage level index range.

203. The access network device determines, based on the coverage requirement, a coverage level or a transmission parameter used to transmit the multicast service to a terminal device.

After receiving the coverage requirement, the base station may determine, based on the coverage level index or the coverage level index range corresponding to the coverage requirement, the coverage level or the transmission parameter used for transmitting the multicast service to the terminal device this time. The coverage level index may be represented by 0, 1, 2 . . . . Different coverage level indexes are corresponding to different coverage levels or transmission parameters. Different coverage levels are corresponding to different transmission parameters. The transmission parameter may include a quantity of retransmission times of the multicast service on a control channel or a shared channel of a physical layer, for example, the quantity of retransmission times may be 256, 512, 1024, or the like.

Therefore, the access network device may determine, based on the coverage requirement received from the core network, the coverage level or the transmission parameter actually used in the current multicast service transmission. This avoids problems of a low transmission success rate and resource waste by preventing the base station from selecting an improper coverage level or transmission parameter.

The following further describes the foregoing embodiment.

Figure 3:
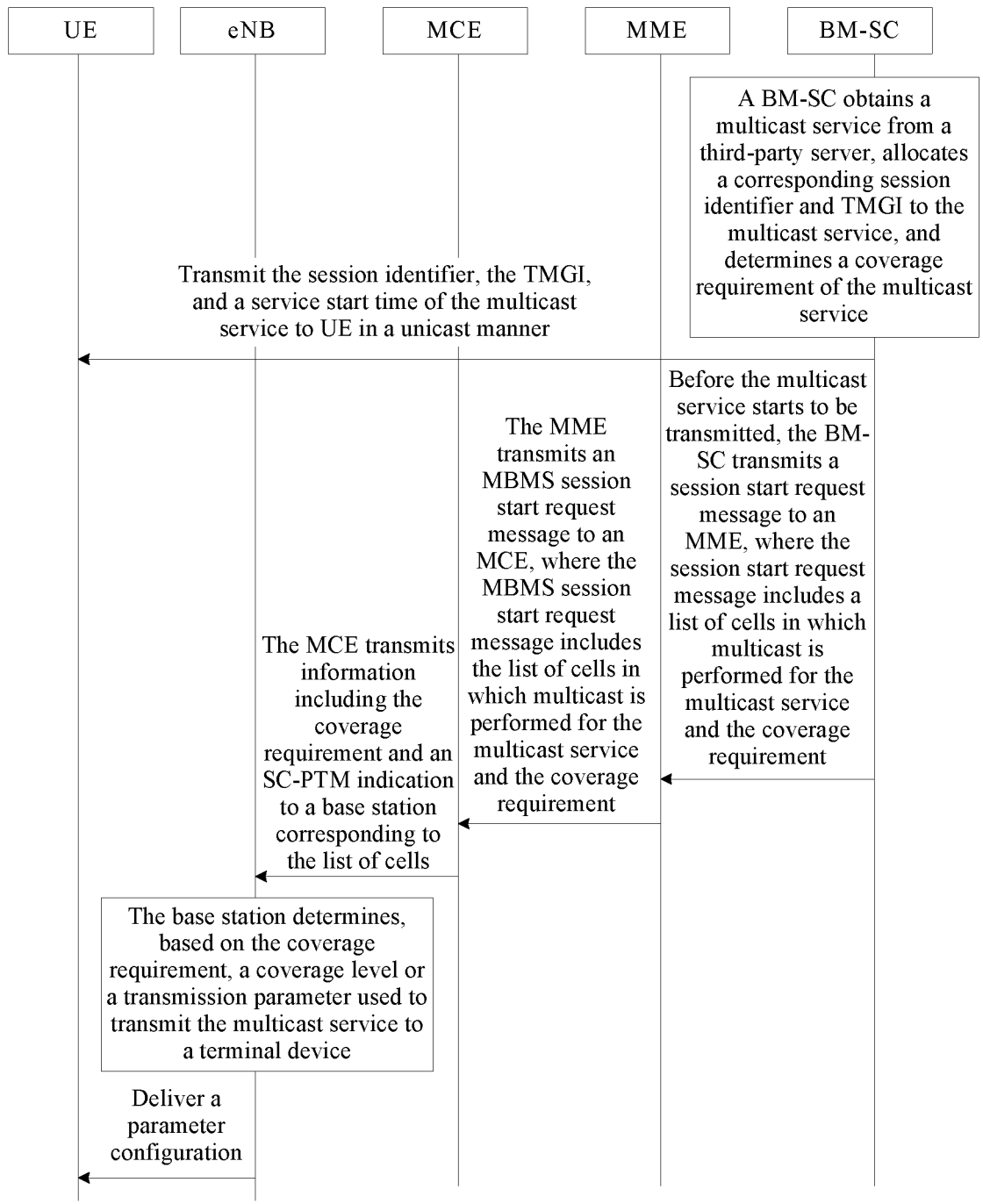
FIG. 3 is a schematic flowchart of a multicast service transmission method according to an embodiment of the present application.

An embodiment of the present application provides a multicast service transmission method. As shown in FIG. 3, the method includes the following steps.

301. A BM-SC obtains a multicast service from a third-party server, allocates a corresponding session identifier and TMGI to the multicast service, and determines a coverage requirement of the multicast service.

When delivering the multicast service, the third-party server transmits the multicast service to the BM-SC of a core network device. The BM-SC allocates the session identifier (Session ID) and the TMGI to the multicast service, so that the session identifier and the TMGI are transmitted to UE that is to receive the multicast service and the UE starts to receive the multicast service. In addition, the BM-SC may determine the coverage requirement of the multicast service based on a correspondence, provided by the third-party server, between a service type of the multicast service and the coverage requirement of the multicast service, or the BM-SC may determine the coverage requirement of the multicast service based on a service type of the multicast service provided by the third-party server, and a correspondence, preconfigured by the BM-SC, between a service type of the multicast service and the coverage requirement of the multicast service. The coverage requirement is used to represent a coverage enhancement degree when a base station transmits the multicast service to a terminal device. Different coverage requirements are corresponding to different coverage levels or transmission parameters.

For example, the BM-SC may determine a coverage requirement based on a service type of a current service provided by the third-party server. For example, a road lamp has relatively good coverage, and a coverage requirement of a road lamp software upgrade service may be relatively low, a basement has relatively poor coverage, and a coverage requirement of a water and electricity meter software upgrade service of the basement may be relatively high. Alternatively, an operation and maintenance or network management system of an operator may preconfigure a correspondence between a service type and a coverage requirement on the BM-SC. In this way, after obtaining the service type from the third-party server, the BM-SC may determine the coverage requirement of the multicast service based on the preconfigured correspondence.

302. The BM-SC transmits the session identifier, the TMGI, and a service start time of the multicast service to UE in a unicast manner.

In this way, the UE may prepare to receive the multicast service based on the session identifier, the TMGI, and the service start time.

303. Before the multicast service starts to be transmitted, the BM-SC transmits a session start request message to an MME, where the session start request message includes a list of cells in which multicast is performed for the multicast service and the coverage requirement.

The list of cells includes a cell identifier of a base station receiving the multicast service, so that the MME transmits the coverage requirement to the base station indicated by the cell identifier. The coverage requirement may be indicated by a numeral or another identifier. Different data or identifiers indicate different coverage levels or transmission parameters.

304. The MME transmits an MBMS session start request message to an MCE, where the MBMS session start request message includes the list of cells in which multicast is performed for the multicast service and the coverage requirement.

305. The MCE transmits information including the coverage requirement and an SC-PTM indication to a base station corresponding to the list of cells.

SC-PTM is a single cell point to multipoint technology, and is used to transmit the multicast service. When the base station receives the SC-PTM indication, the base station determines a coverage level or a transmission parameter based on the coverage requirement, and delivers the received service to the UE in a multicast manner.

306. The base station determines, based on the coverage requirement, a coverage level or a transmission parameter used to transmit the multicast service to a terminal device.

Different coverage requirements are corresponding to different coverage levels or transmission parameters. For example, when the coverage requirement is 0, the coverage level is 0, and the corresponding transmission parameter may be a quantity of retransmission times of the multicast service on a control channel or a shared channel of a physical layer, for example, the quantity of retransmission times may be 256, 512, 1024, or the like. Alternatively, the transmission parameter may be a range of a quantity of retransmission times, for example, a value of the range is [256,512]. The base station may obtain values in the range based on different service types, so as to select a proper quantity of retransmission times for a service. For example, in a road lamp software upgrade service, a road lamp has relatively good coverage, and a selected quantity of retransmission times may be relatively small, in a water and electricity meter software upgrade service in a basement, water and electricity meters have relatively poor coverage, and a selected quantity of retransmission times may be relatively large. Further, the base station may deliver a parameter configuration to the UE by using system information block (SIB) 20 and a single-cell MBMS control channel (SC-MCCH), where the parameter configuration includes the quantity of retransmission times, and transmit the multicast service to the UE by using a single-cell MBMS traffic channel (SC-MTCH).

Therefore, after determining the coverage requirement of the to-be-transmitted multicast service, the BM-SC of a core network transmits the coverage requirement to the base station by using the MME and the MCE, so that the base station determines the coverage level or the transmission parameter based on the received coverage requirement, to avoid problems of a low transmission success rate and resource waste by preventing the base station from selecting an improper coverage level or transmission parameter.

Figure 4A:
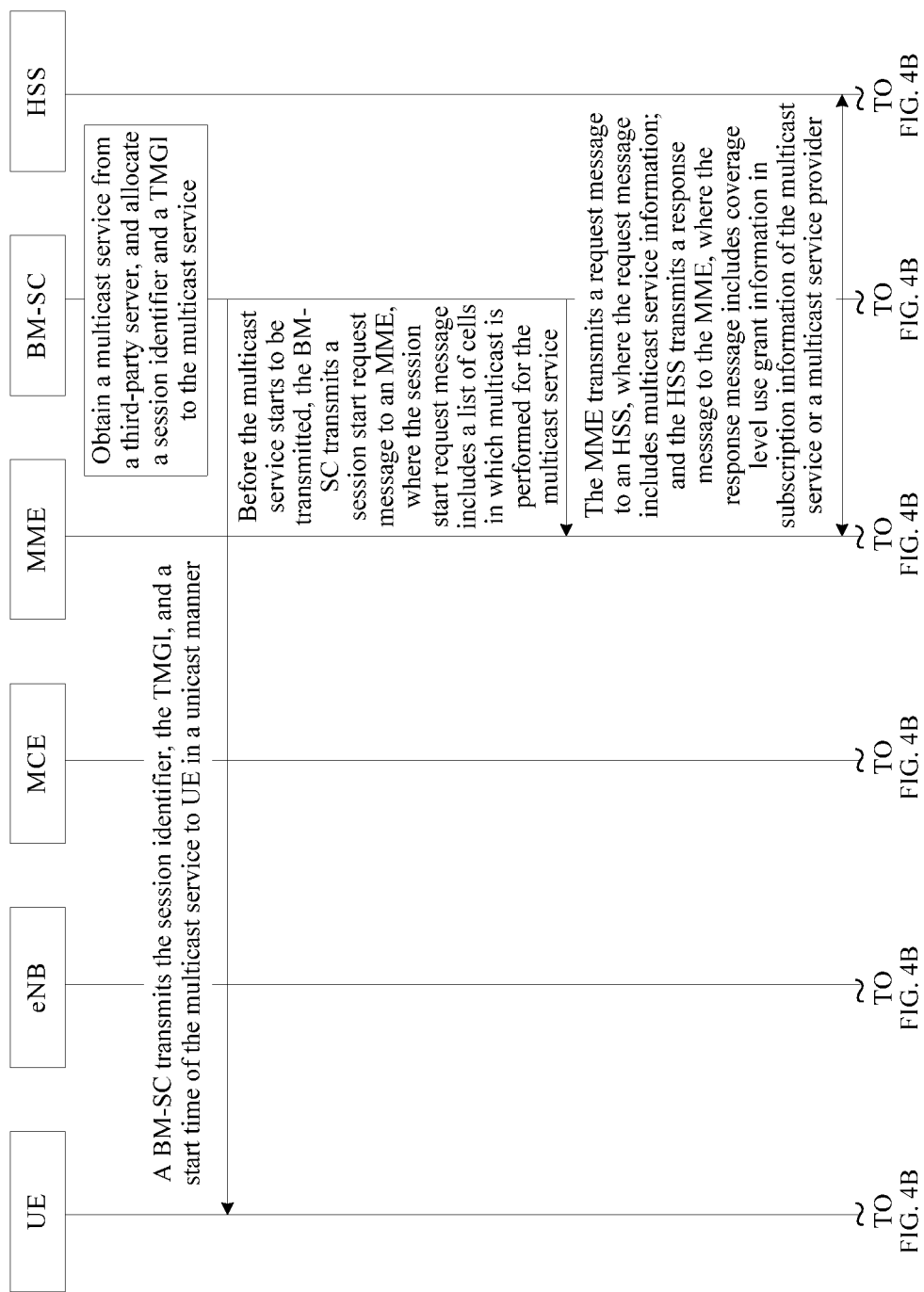

For the prior-art problem of resource waste caused by decrease of transmission reliability when a base station cannot determine a proper coverage level for transmitting a multicast service, an embodiment of the present application provides a multicast service transmission method. As shown in FIGS. 4A-4B, the method includes the following steps.

401. A BM-SC obtains a multicast service from a third-party server, and allocates a session identifier and a TMGI to the multicast service.

When delivering the multicast service, the third-party server transmits the multicast service to the BM-SC of a core network device. The BM-SC allocates the session identifier Session ID and the TMGI to the multicast service, so that the session identifier and the TMGI are transmitted to UE that is to receive the multicast service and the UE starts to receive the multicast service.

402. The BM-SC transmits the session identifier, the TMGI, and a start time of the multicast service to UE in a unicast manner.

403. Before the multicast service starts to be transmitted, the BM-SC transmits a session start request message to an MME, where the session start request message includes a list of cells in which multicast is performed for the multicast service.

404. The MME transmits a request message to an HSS, where the request message includes multicast service information, and the HSS transmits a response message to the MME, where the response message includes coverage level use grant information in subscription information of the multicast service or a multicast service provider.

The multicast service information may include the session identifier, the TMGI, an identifier of the multicast service provider, or the like. The response message may include the coverage level use grant information included in subscription information of the TMGI, and the subscription information of the TMGI is allocated by the HSS to the multicast service, or the response message may include the coverage level use grant information determined by the HSS based on the subscription information of the multicast service provider. The subscription information is generated when the multicast service or the multicast service provider is registered with a network, and is stored in the HSS. Subscription information may include coverage level use permission of a service or a service provider in the network 405. The MME determines a coverage requirement of the multicast service based on the use grant information, and transmits an MBMS session start request message to an MCE, where the MBMS session start request message includes the coverage requirement of the multicast service and the list of cells in which multicast is performed for the multicast service.

The MME may determine the coverage requirement of the multicast service based on a preset correspondence between coverage level use permission and a coverage requirement, and transmit the coverage requirement of the multicast service to the MCE. The list of cells includes a cell identifier of a base station receiving the multicast service, so that the MCE transmits the coverage requirement of the multicast service to the base station indicated by the list of cells.

406. The MCE transmits an SC-PTM indication and the coverage requirement of the multicast service to a base station.

407. The base station determines, based on the coverage requirement of the multicast service, a coverage level or a transmission parameter used by the base station to transmit the multicast service to the UE.

For an implementation of step 407, refer to step 306. Details are not described herein again.

Therefore, the HSS of a core network transmits, to the MME, coverage level use permission of the multicast service or the multicast service provider in network transmission, so that after determining the coverage requirement of the multicast service based on the coverage level use permission, the MME transmits the coverage requirement to the base station by using the MCE. In this way, the base station may determine the coverage level or the transmission parameter based on the received coverage requirement, to avoid problems of a low transmission success rate and resource waste by preventing the base station from selecting an improper coverage level or transmission parameter.

Figure 5:
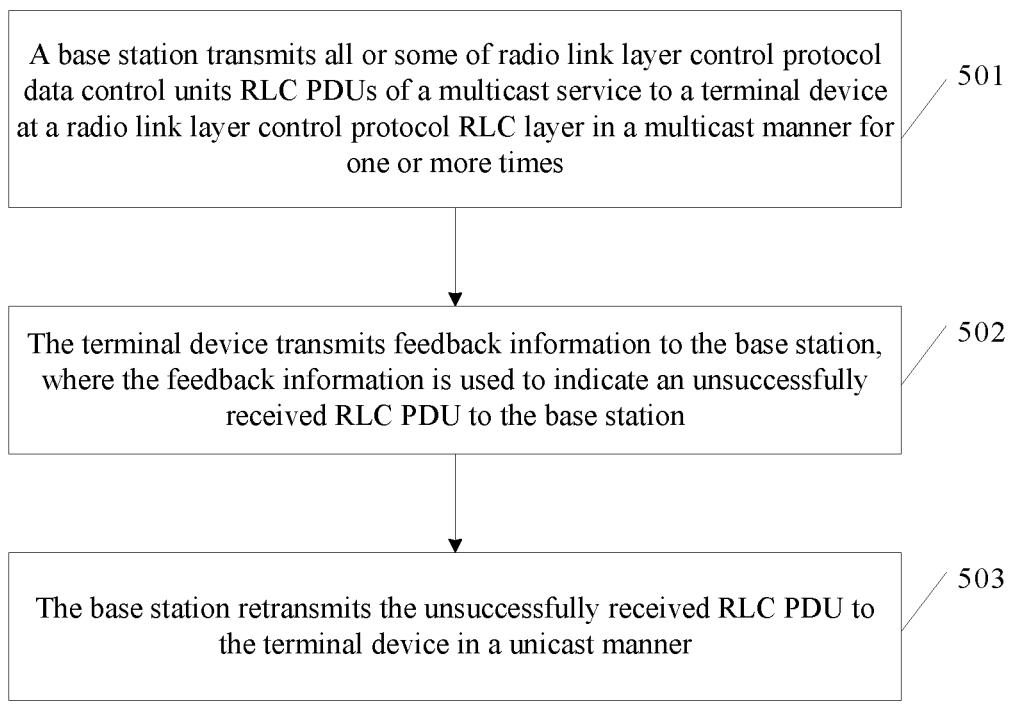
FIG. 5 is a schematic flowchart of a multicast service transmission method according to an embodiment of the present application.

In the following, for the prior-art problem that when an IP data packet is transmitted in NB-IoT, if one or several TBs are unsuccessfully transmitted, the entire IP data packet is retransmitted and additional retransmission and reception overheads are caused, an embodiment of the present application provides a multicast service transmission method. As shown in FIG. 5, the method includes the following steps.

501. A base station transmits all or some of radio link layer control protocol data control units RLC PDUs of a multicast service to a terminal device at a radio link layer control protocol RLC layer in a multicast manner for one or more times.

The transmitting all or some of RLC PDUs for a plurality of times herein may be understood as that the base station retransmits all or some of the RLC PDUs to the terminal device for N times, where N is a positive integer. Some of the RLC PDUs are RLC PDUs included in each of parts into which several RLC PDUs formed by segmenting an IP data packet and performing cascading at the RLC layer are divided.

It should be noted that the terminal device may be in a connected mode or in an idle mode when receiving the multicast service transmitted by the base station. For example, in NB-IoT, a terminal may be in the idle mode to receive the multicast service.

502. The terminal device transmits feedback information to the base station, where the feedback information is used to indicate an unsuccessfully received RLC PDU to the base station.

The terminal device feeds back the unsuccessfully received RLC PDU to the base station when completely receiving all of the RLC PDUs, or the terminal device feeds back the unsuccessfully received RLC PDUs to the base station when completely receiving some of the RLC PDUs, so that the base station continues to transmit a next RLC PDU to the terminal device.

503. The base station retransmits the unsuccessfully received RLC PDU to the terminal device.

The base station may retransmit the unsuccessfully received RLC PDU to the terminal device in a unicast manner, or may retransmit, in a multicast manner based on feedback information of a plurality of terminal devices, RLC PDUs unsuccessfully received by the plurality of terminal devices. This is not limited in this application.

In this way, after completely transmitting all or some of the RLC PDUs of the multicast service, the base station may retransmit the unsuccessfully received RLC PDU to the terminal device based on the feedback information of the terminal device. This can increase a transmission success rate of an IP data packet on a base station side, and can also avoid waste of network resources caused by retransmission of the entire IP data packet when a few TBs are incorrectly transmitted.

The following further describes the embodiment shown in FIG. 5.

Figure 6:
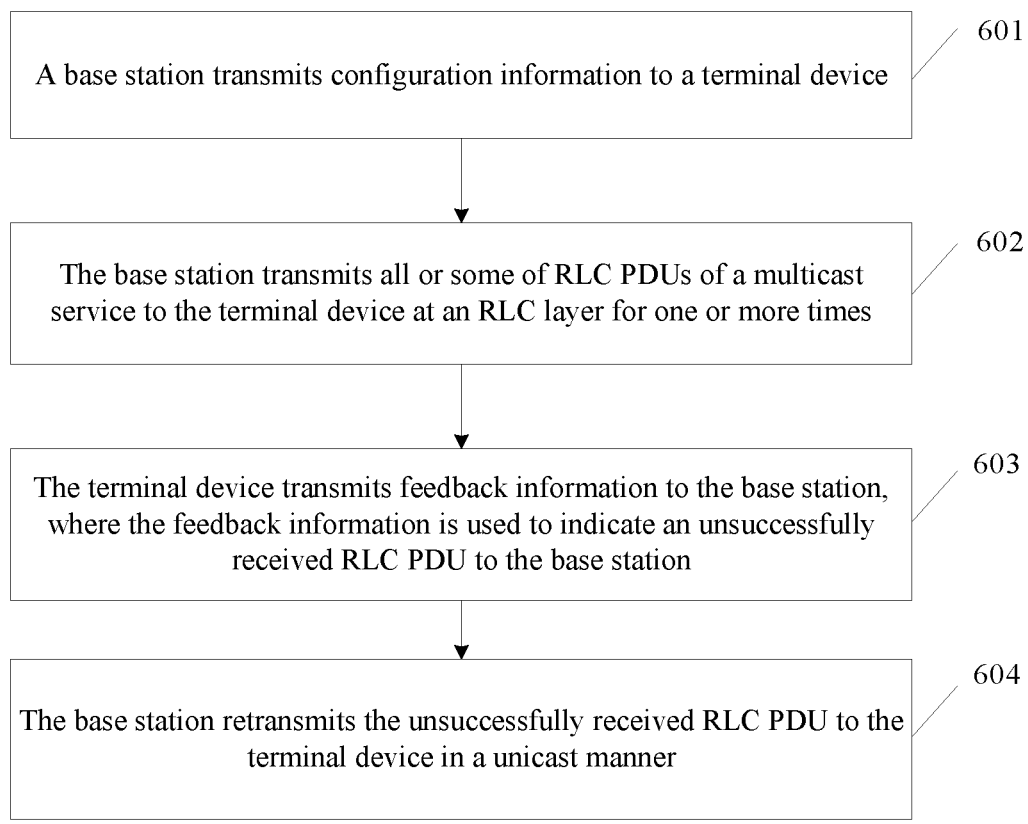
FIG. 6 is a schematic flowchart of a multicast service transmission method according to an embodiment of the present application.

An embodiment of the present application provides a multicast service transmission method. As shown in FIG. 6, the method includes the following steps.

601. A base station transmits configuration information to a terminal device.

The configuration information may include at least one of a quantity of retransmission times of all or some of RLC PDUs of a multicast service at an RLC layer, first indication information, and a first timer, the first indication information is used to indicate whether all or some of the RLC PDUs support the terminal device in feeding back and retransmitting in a unicast manner an unsuccessfully received RLC PDU at the RLC layer, and the first timer is used to indicate duration in which the base station receives feedback information within a preset time.

The quantity of retransmission times is a quantity of times that the base station transmits all or some of the RLC PDUs to the terminal device for a plurality of times. The configuration information transmitted for different multicast services by the base station to the terminal device may be the same or different. This is not limited in this application.

That a base station transmits configuration information to a terminal device may include the base station broadcasts system information to the terminal device, where the system information includes the configuration information, for example, the base station adds the configuration information to a dedicated system information block (SIB) 20 of SC-PTM and transmits the dedicated system information block 20 to the terminal device, the base station may transmit the configuration information to the terminal device on an MBMS control channel SC-MCCH, or the base station may transmit the configuration to the terminal device on a physical downlink control channel (PDCCH) of an MBMS traffic channel SC-MTCH. This is not limited in this application.

602. The base station transmits all or some of RLC PDUs of a multicast service to the terminal device at an RLC layer for one or more times.

The base station may segment and cascade an IP data packet of the multicast service at the RLC layer to form several RLC PDUs. Then the base station may transmit all of the RLC PDUs to the terminal device at the RLC layer once, or may transmit a part of the several RLC PDUs to the terminal device at the RLC layer once and then continue to transmit a next part of the several RLC PDUs. Alternatively, the base station may retransmit all or some of the RLC PDUs of the IP data packet to the terminal device at the RLC layer based on the quantity of retransmission times in the configuration information in step 601. This can increase a reception success rate of the RLC PDUs, that is, increase a reception success rate of the IP data packet provided on a base station side.

When the base station transmits all of the RLC PDUs to the terminal device at the RLC layer in a multicast manner for a plurality of times, in a possible implementation, each RLC PDU header includes a first field, and the first field is used to indicate that a currently transmitted RLC PDU is retransmitted for an $N^{th}$ time, in other words, the first field is used to indicate that a current retransmission time is a first time, a second time, a third time, or the like, or the first field is used to indicate whether a currently transmitted RLC PDU is retransmitted for a last time, and one bit may be occupied, or downlink control information transmitted on a PDCCH transmitting an RLC PDU includes indication information used to indicate whether the currently transmitted RLC PDU is retransmitted for a last time, and one bit may be occupied. In this way, for the terminal device, assuming that the terminal device successfully receives all of the RLC PDUs transmitted at a given retransmission time, when a terminal receives an RLC PDU transmitted next time, if an RLC PDU header still shows retransmission of the RLC PDUs that are previously transmitted, the terminal may continue to receive, after a period of time, the RLC PDUs that are retransmitted by the base station for the last time, to achieve an effect of power saving.

In addition, when the base station transmits all of the RLC PDUs to the terminal device at the RLC layer in the multicast manner for a plurality of times, re-segmentation for transmission is supported between different retransmissions of a same RLC PDU. For example, when an RLC PDU 0 is transmitted for a second time, because an air interface may change in this case and a physical layer cannot provide a TBS of a same size to carry the RLC PDU 0, the base station may re-segment the RLC PDU 0 and further split the original RLC PDU into several RLC PDU segments for transmitting. That is, when retransmitting any RLC PDU, the base station may re-segment the RLC PDU to obtain at least one RLC PDU segment. Each RLC PDU segment carries a same serial number as the original RLC PDU, a sub serial number of the RLC PDU segment, and indication information used to indicate whether the RLC PDU segment is a last segment of the RLC PDU.

No matter whether the base station transmits all of the RLC PDUs of the IP data packet of the multicast service for one time or for more times, a last RLC PDU in a last retransmission performed by the base station may include indication information used to indicate that all of the RLC PDUs of the multicast service are received, for example, an indication bit indicating completion of all retransmissions may be reserved in an RLC PDU, and completion of transmitting all of the RLC PDUs is indicated in a last RLC PDU of transmission performed for a last time, so that the terminal device learns of retransmission completion of the multicast service. Alternatively, a last RLC PDU in all of the RLC PDUs of the multicast service that are retransmitted by the base station each time includes indication information used to indicate that all of the RLC PDUs of the multicast service are transmitted for an $N^{th}$ time, so that UE may determine, with reference to the quantity of retransmission times in the configuration information, whether all of the RLC PDUs are transmitted.

When transmitting the multicast service to the terminal device at the RLC layer, the base station may divide the multicast service into several parts at the RLC layer to obtain a plurality of parts of RLC PDUs, and transmit each part of RLC PDUs for one or more times. An implementation of transmitting each part of RLC PDUs is similar to that of transmitting all of the RLC PDUs by the base station, and a last RLC PDU in each part of RLC PDUs carries indication information indicating completion of transmission of the part of RLC PDUs. The multicast service may be divided into the several parts based on a granularity of each IP data packet, a maximum buffer of the RLC layer, or a maximum serial number (SN) limitation of the RLC layer, or may be divided based on flexible control by the base station.

603. The terminal device transmits feedback information to the base station, where the feedback information is used to indicate an unsuccessfully received RLC PDU to the base station.

After the base station determines that one or more transmissions of all of the RLC PDUs are completed, for the base station, the base station may cache all the RLC PDUs during running of the first timer, so as to receive, during the running of the first timer, the feedback information transmitted by the terminal device and retransmit, to the terminal device in a unicast manner, the unsuccessfully received RLC PDU indicated by the feedback information.

For example, if the terminal device determines that there is an unsuccessfully received RLC PDU, a second timer may be started in the terminal device based on duration of the first timer in the configuration information. Duration of the second timer is the same as the duration of the first timer. The terminal device may initiate a random access procedure in the duration of the second timer, to feed back the unsuccessfully received RLC PDU to the base station. The feedback information carries information about the unsuccessfully received RLC PDU, for example, an SN. In addition, when initiating random access, the terminal device may also add a new cause value to an access request, to indicate that the random access is used for multicast feedback. For a multicast transmission service, a large quantity of terminal devices may perform feedback. When the terminal devices randomly select a time from [0-duration of the second timer] to access the base station, network congestion can be alleviated.

In addition, for multicast transmission, the second timer in the terminal device is started when the terminal device identifies that the base station has completely transmitted all of the RLC PDUs of the multicast service. However, if the terminal device cannot identify, due to a reception error such as unsuccessful reception of a last RLC PDU, whether the multicast service is transmitted, no feedback is triggered. Therefore, the terminal device may start or restart a third timer each time an RLC PDU is received. If the terminal device receives no new RLC PDU when the third timer expires, it may be considered that network exception occurs. If the terminal device is in an idle mode, the terminal device may directly initiate random access and perform feedback in a connected mode, to obtain a new RLC PDU from the base station. The third timer may be configured by the base station and is carried in the configuration information. In other words, the configuration information may further include the third timer. The third timer is used by the terminal device to transmit the feedback information to the base station when no RLC PDU is received within a preset time of the third timer after an RLC PDU is received each time, to indicate the unsuccessfully received RLC PDU to the base station.

604. The base station retransmits the unsuccessfully received RLC PDU to the terminal device.

The base station may retransmit the unsuccessfully received RLC PDU to the terminal device in the unicast manner, or may retransmit, in the multicast manner based on feedback information of a plurality of terminal devices, RLC PDUs unsuccessfully received by the plurality of terminal devices. This is not limited in this application.

When the base station retransmits any RLC PDU in the unicast manner, re-segmentation may also be supported between multicast transmission and unicast retransmission. For example, when the base station retransmits an RLC PDU 0 in the unicast manner, if the air interface changes and the physical layer cannot provide a TBS of a same size to carry the RLC PDU 0, the base station re-segments the RLC PDU 0 during unicast retransmission, and splits the RLC PDU 0 into several RLC PDU segments for transmitting. Similar to step 602, when retransmitting any RLC PDU in the unicast manner, the base station may re-segment the RLC PDU to obtain at least one RLC PDU segment. Each RLC PDU segment carries a same serial number as the original RLC PDU, a sub serial number of the RLC PDU segment, and indication information used to indicate whether the RLC PDU segment is a last segment of the RLC PDU.

Figure 7:
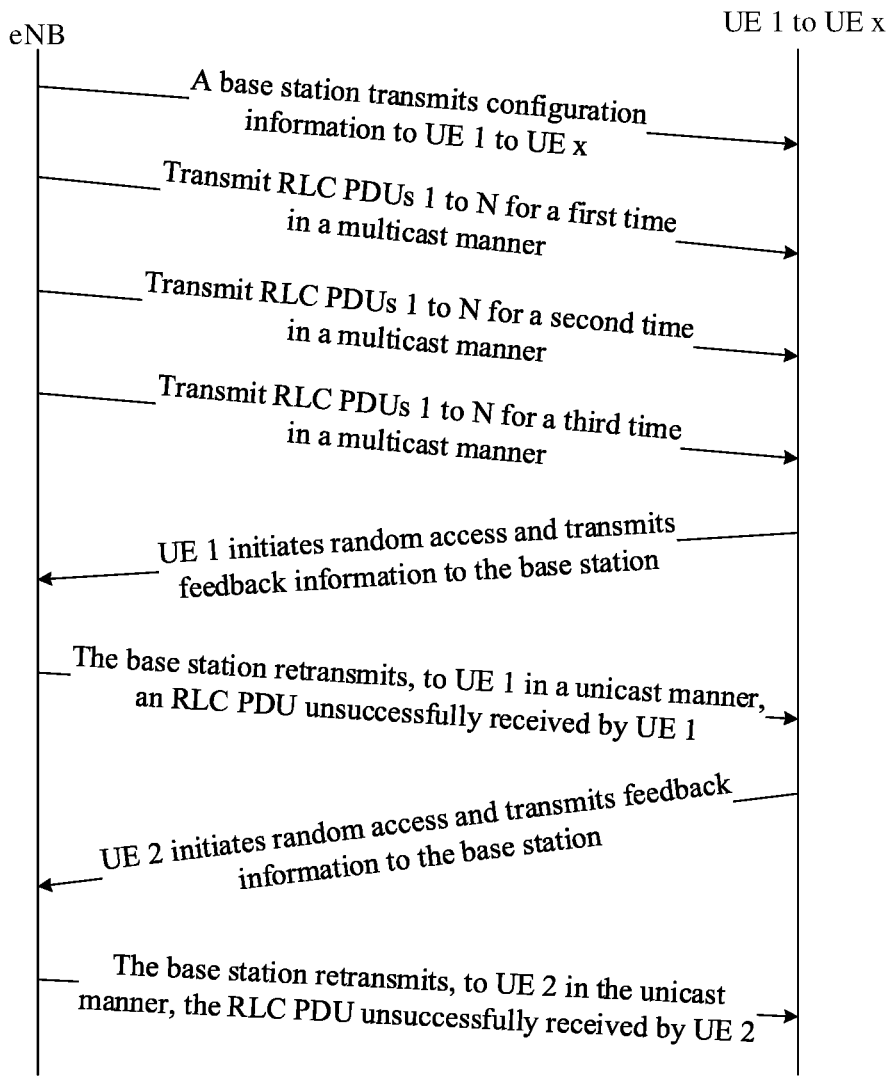
FIG. 7 is a signal flowchart of transmitting all of RLC PDUs of a multicast service for a plurality of times according to an embodiment of the present application.

Based on descriptions of step 601 to step 604, it is assumed that the base station needs to transmit a multicast service after transmitting configuration information to UE 1 to UE x. Assuming that the multicast service has a total of N RLC PDUs, the N RLC PDUs are transmitted for three times, and an $N^{th}$ RLC PDU transmitted for a third time carries a transmission completion indication, if UE 1 and UE 2 have unsuccessfully received RLC PDUs after the three times of transmitting, UE 1 and UE 2 may initiate random access, to transmit feedback information to the base station. As shown in FIG. 7, assuming that UE 1 initiates random access to the base station before UE 2, the base station first retransmits, to UE 1 in the unicast manner, an RLC PDU unsuccessfully received by UE 1, and then retransmits, to UE 2 in the unicast manner, an RLC PDU unsuccessfully received by UE 2.

Figure 8:
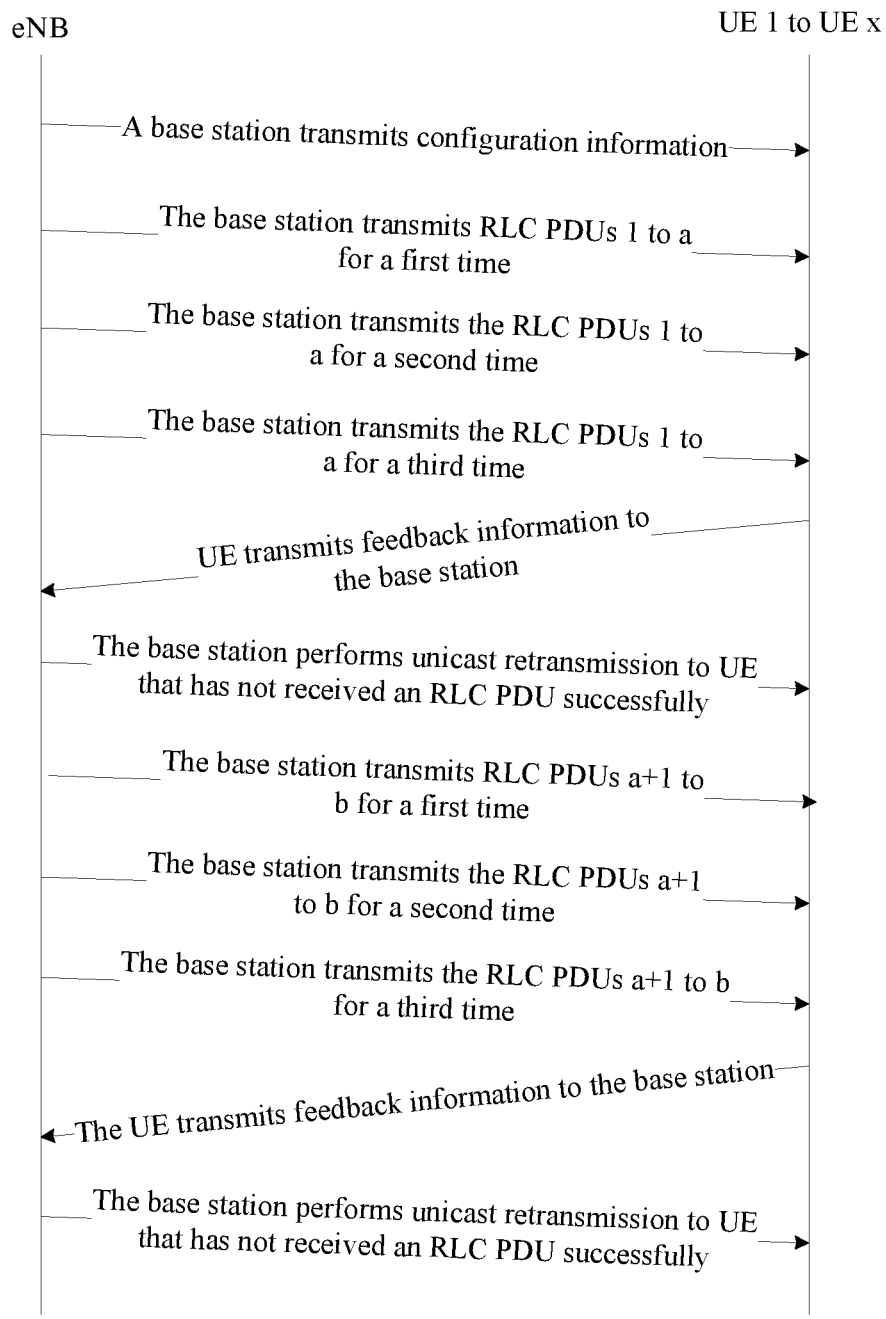
FIG. 8 is a signal flowchart of transmitting some of RLC PDUs of a multicast service for a plurality of times according to an embodiment of the present application.

As shown in FIG. 8, it is assumed that a manner in which after transmitting configuration information to UE 1 to UE x, the base station first retransmits a first part of RLC PDUs 1 to a and then continues to transmit a second part of RLC PDUs a+1 to b is used for description, where a quantity of retransmission times in the configuration information is 3. The base station first transmits the RLC PDUs 1 to a to UE 1 to UE x for a first time, then transmits the RLC PDUs 1 to a to UE 1 to UE x for a second time, and then transmits the RLC PDUs 1 to a to UE 1 to UE x for a third time. A last RLC PDU in the RLC PDUs 1 to a that are transmitted for the third time carries an indication of retransmission completion. Then, UE that has not received an RLC PDU successfully in UE 1 to UE x transmits feedback information to the base station, and then the base station performs unicast retransmission to the UE that has not received an RLC PDU successfully. Then, the base station transmits the RLC PDUs a+1 to b to UE 1 to UE x for a first time, then transmits the RLC PDUs a+1 to b to UE 1 to UE x for a second time, and then transmits the RLC PDUs a+1 to b to UE 1 to UE x for a third time. A last RLC PDU in the RLC PDUs a+1 to b that are transmitted for the third time carries an indication of completion of retransmissions. Then UE that has not received an RLC PDU successfully in UE 1 to UE x transmits feedback information to the base station, and then the base station performs unicast retransmission to the UE that has not received an RLC PDU successfully.

Therefore, in this embodiment, the multicast service is transmitted at the RLC layer for a plurality of times. This can increase a reception success rate of the RLC PDU, that is, increase a reception success rate of a UDP/IP data packet provided on a base station side. In addition, after the multicast service is transmitted, unicast retransmission of the RLC layer is performed on the base station side. This can increase the transmission success rate of the UDP/IP data packet on the base station side, and also resolves a problem of waste of network resources caused by retransmission of the entire UDP/IP data packet when a few TBs are incorrectly transmitted. Further, when the base station transmits all of the RLC PDUs to the terminal device for one or more times, the base station and the UE need to cache all of the RLC PDUs in each multicast transmission, and consequently storage costs of the terminal device are increased. In this case, the base station may transmit the part of RLC PDUs to the terminal device for one or more times. After receiving the feedback information and retransmitting the unsuccessfully received RLC PDU to the terminal device in the unicast manner, the base station then transmits a next part of RLC PDUs to the terminal device, thereby reducing storage costs of the base station and the terminal device.

The foregoing mainly describes, from a perspective of interaction between various network elements, the solutions provided in the embodiments of the present application. It can be understood that, to implement the foregoing functions, the network elements such as the core network device, the access network device, and the terminal device include corresponding hardware structures and/or software modules for performing the functions. A person skilled in the art should easily be aware that, in combination with the examples described in the embodiments disclosed in this specification, units and algorithms steps may be implemented by hardware or a combination of hardware and computer software in the present application. Whether a function is performed by hardware or by computer software driving hardware depends on particular applications and design constraints of the technical solutions. A person skilled in the art may use different methods to implement the described functions for each particular application, but it should not be considered that the implementation goes beyond the scope of the present application.

In the embodiments of the present application, the core network device, the access network device, the terminal device, and the like may be divided into functional modules based on the foregoing method example. For example, various functional modules corresponding to various functions may be obtained through division, or two or more functions may be integrated into one processing module. The integrated module may be implemented in a form of hardware, or may be implemented in a form of a software functional module. It should be noted that module division in the embodiments of the present application is schematic, and is merely logical function division. In an actual implementation, another division manner may be used.

Figure 9:
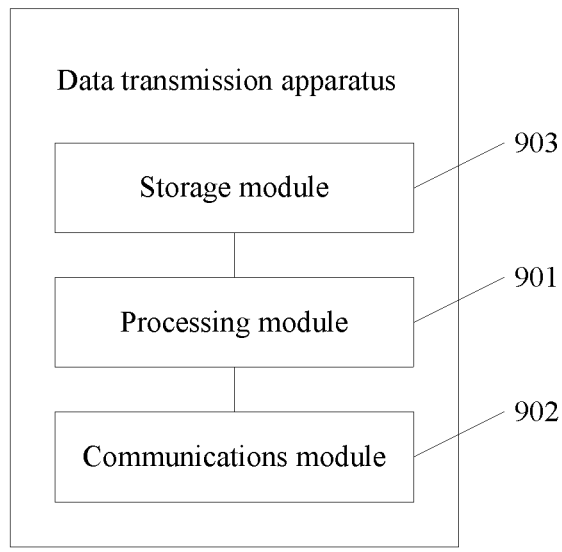
FIG. 9 is a schematic structural diagram of a core network device according to an embodiment of the present application.

FIG. 9 is a possible schematic structural diagram of a data transmission apparatus related in the foregoing embodiments. The apparatus may be configured to perform a function of behavior of the core network device in the foregoing method embodiments. The apparatus may include a processing module 901 and a communications module 902. Specifically, an entity device corresponding to the processing module 901 may be a processor, and an entity device corresponding to the communications module 902 may be a transceiver. The apparatus may further include a storage module 903, configured to store program code and data of a core network device.

Figure 10:
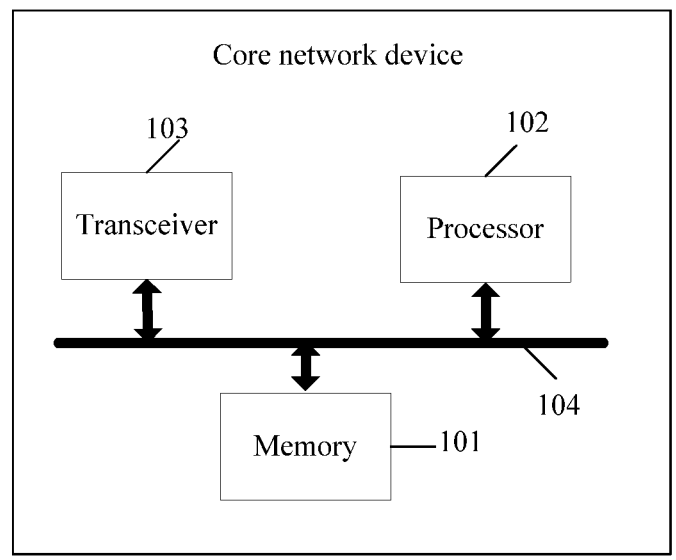
FIG. 10 is a schematic structural diagram of a core network device according to an embodiment of the present application.

When the processing module 901 is the processor, the communications module 902 is the transceiver, and the storage module 903 is a memory, the core network device related in this embodiment of the present application may be a core network device shown in FIG. 10.

Referring to FIG. 10, the core network device includes a processor 102, a transceiver 103, a memory 101, and a bus 104. The transceiver 103, the processor 102, and the memory 101 are interconnected by using the bus 104. The bus 104 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 10, but this does not mean that there is only one bus or only one type of bus.

Figure 11:
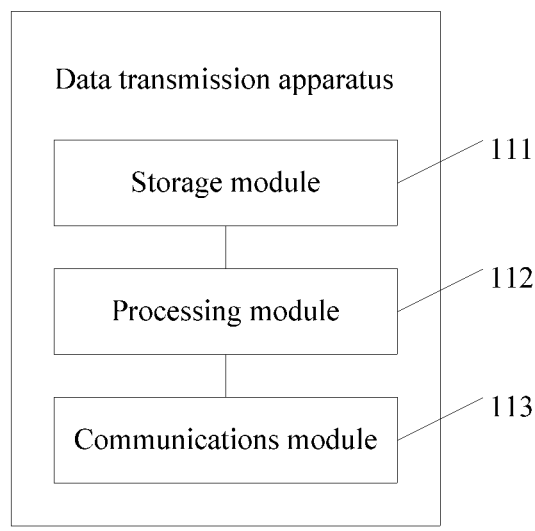
FIG. 11 is a schematic structural diagram of an access network device according to an embodiment of the present application.

FIG. 11 is a possible schematic structural diagram of another data transmission apparatus related in the foregoing embodiments. The apparatus may be configured to perform a function of behavior of the access network device in the foregoing method embodiments. The apparatus may include a processing module 112 and a communications module 113. Specifically, an entity device corresponding to the processing module 112 may be a processor, and an entity device corresponding to the communications module 113 may be a transceiver. The apparatus may further include a storage module 111, configured to store program code and data of an access network device.

Figure 12:
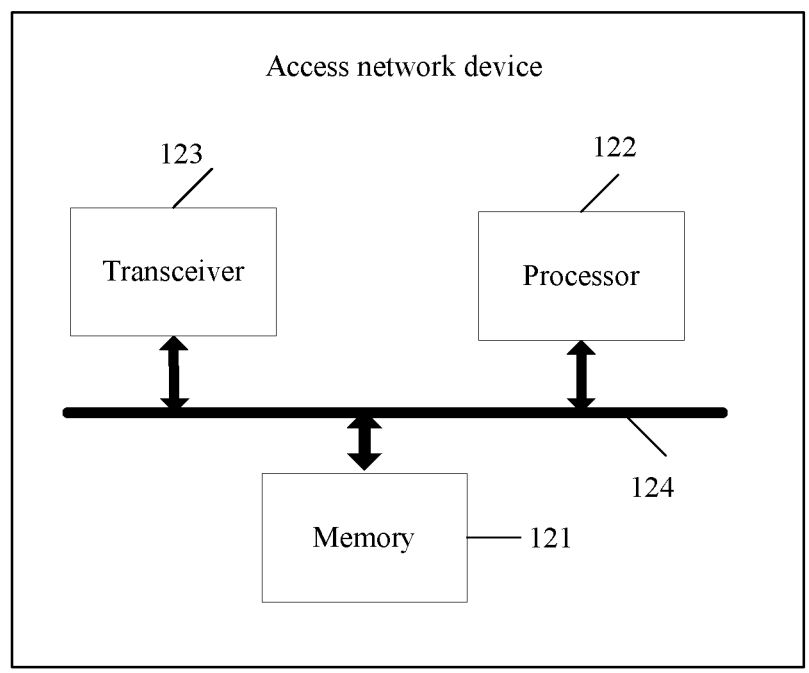
FIG. 12 is a schematic structural diagram of an access network device according to an embodiment of the present application.

When the processing module 112 is the processor, the communications module 113 is the transceiver, and the storage module 111 is a memory, the access network device related in this embodiment of the present application may be an access network device shown in FIG. 12.

Referring to FIG. 12, the access network device includes a processor 122, a transceiver 123, a memory 121, and a bus 124. The transceiver 123, the processor 122, and the memory 121 are interconnected by using the bus 124. The bus 124 may be a Peripheral Component Interconnect PCI bus, an Extended Industry Standard Architecture EISA bus, or the like. The bus may be classified into an address bus, a data bus, a control bus, and the like. For ease of representation, only one thick line is used to represent the bus in FIG. 12, but this does not mean that there is only one bus or only one type of bus.

Figure 13:
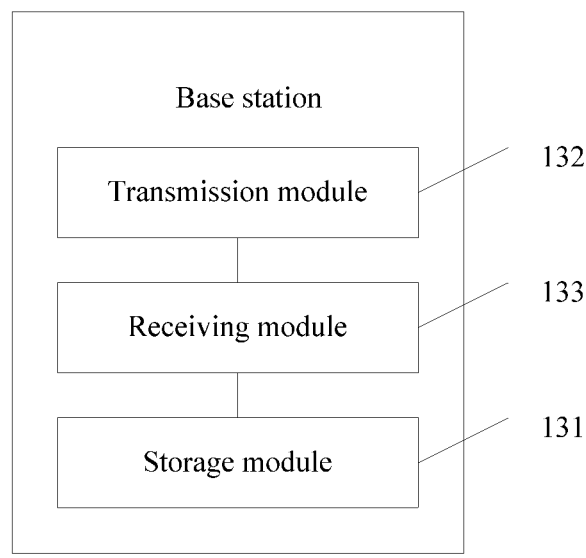
FIG. 13 is a schematic structural diagram of a base station according to an embodiment of the present application.

FIG. 13 is a possible schematic structural diagram of a base station related in the foregoing embodiments. The base station is configured to perform a function of behavior of the base station in the foregoing method embodiments. The base station may include a transmission module 132 and a receiving module 133. An entity device corresponding to the transmission module 132 and the receiving module 133 may be a transceiver. The base station may further include a storage module 131, configured to store program code and data of the base station.

The transmission module 132 and the receiving module 133 may be a transceiver, a transceiver circuit, a communications interface, or the like. The storage module 133 may be a memory.

Figure 14:
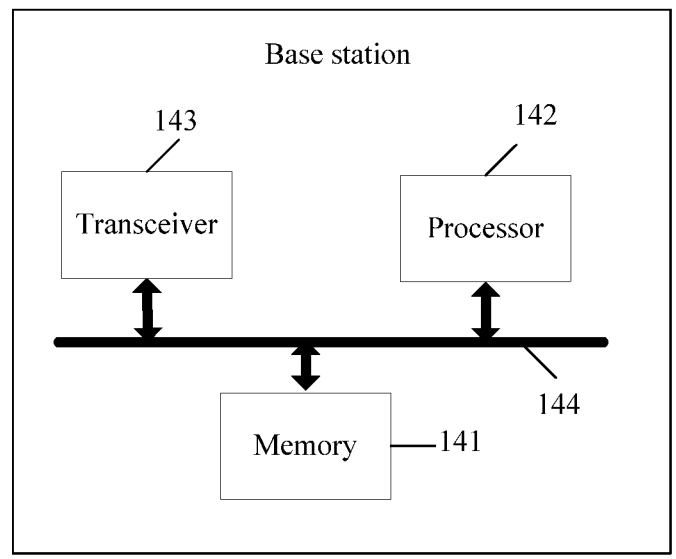
FIG. 14 is a schematic structural diagram of a base station according to an embodiment of the present application.

When the transmission module 132 and the receiving module 133 are the transceiver, and the storage module 131 is the memory, the base station related in this embodiment of the present application may be a base station shown in FIG. 14.

Referring to FIG. 14, the base station includes a processor 142, a transceiver 143, a memory 141, and a bus 144. The transceiver 143 and the memory 141 are interconnected by using the bus 144. The processor 142 is configured to control and manage actions of the base station. The bus 144 may be a Peripheral Component Interconnect PCI bus, an Extended Industry Standard Architecture EISA bus, or the like. The bus may be classified into an address bus, a data bus, a control bus, and the like. For ease of representation, only one thick line is used to represent the bus in FIG. 14, but this does not mean that there is only one bus or only one type of bus.

Figure 15:
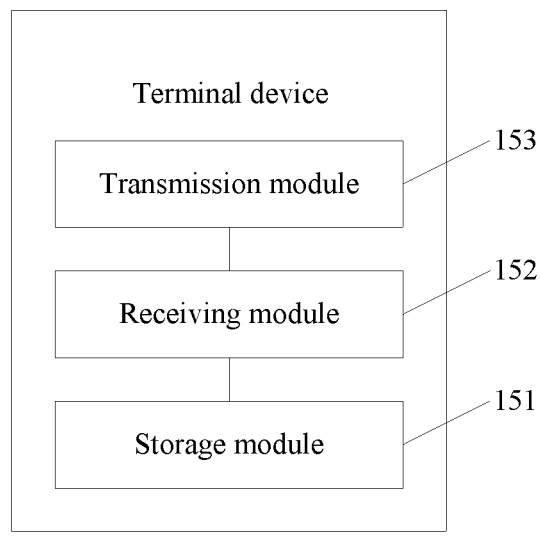
FIG. 15 is a schematic structural diagram of a terminal device according to an embodiment of the present application.

FIG. 15 is a possible schematic structural diagram of a terminal device related in the foregoing embodiments. The terminal device may be configured to perform a function of behavior of the terminal device in the foregoing method embodiments. The terminal device may include a receiving module 152 and a transmission module 153. An entity device corresponding to the receiving module 152 and the transmission module 153 may be a transceiver. The terminal device may further include a storage module 151, configured to store program code and data of the terminal device.

The receiving module 152 and the transmission module 153 may be a transceiver, a transceiver circuit, a communications interface, or the like. The storage module 151 may be a memory.

Figure 16:
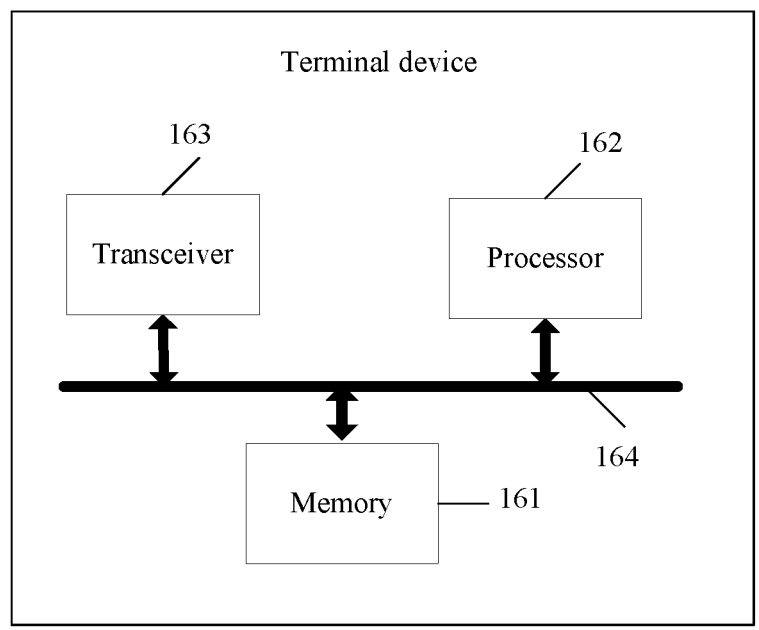
FIG. 16 is a schematic structural diagram of a terminal device according to an embodiment of the present application.

When the receiving module 152 and the transmission module 153 are the transceiver, and the storage module 151 is the memory, the terminal device related in this embodiment of the present application may be a terminal device shown in FIG. 16.

Referring to FIG. 16, the terminal device includes a processor 162, a transceiver 163, a memory 161, and a bus 164. The transceiver 163 and the memory 161 are interconnected by using the bus 164. The processor 162 is configured to control and manage actions of the terminal device. The bus 164 may be a Peripheral Component Interconnect PCI bus, an Extended Industry Standard Architecture EISA bus, or the like. The bus may be classified into an address bus, a data bus, a control bus, and the like. For ease of representation, only one thick line is used to represent the bus in FIG. 16, but this does not mean that there is only one bus or only one type of bus.

Method or algorithm steps described in combination with the content disclosed in the present application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present application may be implemented by hardware, software, firmware, or any combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present application are further described in detail in the foregoing specific implementations. It should be understood that the foregoing descriptions are merely specific implementations of the present application, but are not intended to limit the protection scope of the present application. Any modification, equivalent replacement, or improvement made based on the technical solutions of the present application shall fall within the protection scope of the present application.

What is claimed is:

1. A method, comprising:
  determining, by a core network device, a coverage requirement of a to-be-transmitted multicast service;
  transmitting, by the core network device, the coverage requirement to an access network device, wherein the coverage requirement is usable for determining a transmission parameter used to transmit the to-be transmitted multicast service to a terminal device;
  receiving, by the access network device, the coverage requirement;
  determining, by the access network device according to the coverage requirement, the transmission parameter, wherein the transmission parameter corresponds to a quantity of retransmission times to be used to transmit the to-be-transmitted multicast service; and
  transmitting, by the access network device, the to-be-transmitted multicast service to the terminal device according to the transmission parameter.

2. The method according to claim 1, wherein the transmission parameter comprises:
  an index of a coverage level corresponding to the to-be-transmitted multicast service, wherein the coverage level corresponds to the quantity of retransmission times to be used to transmit the to-be-transmitted multicast service; or
  a quantity of retransmission times of the to-be-transmitted multicast service on a control channel of a physical layer or a shared channel of a physical layer.

3. The method according to claim 1, wherein the core network device comprises a broadcast/multicast service center (BM-SC); and
  wherein determining the coverage requirement of the to-be-transmitted multicast service comprises:
    determining, by the BM-SC, the coverage requirement of the to-be-transmitted multicast service according to a correspondence, provided by a third-party server, between a service type of the to-be-transmitted multicast service and the coverage requirement of the to-be-transmitted multicast service.

4. The method according to claim 1, wherein the core network device comprises a broadcast/multicast service center (BM-SC); and
  wherein determining the coverage requirement of the to-be-transmitted multicast service comprises:
    determining, by the BM-SC, the coverage requirement of the to-be-transmitted multicast service according to a service type of the to-be-transmitted multicast service provided by a third-party server, and further according to a correspondence, preconfigured by the BM-SC, between the service type of the to-be-transmitted multicast service and the coverage requirement of the to-be-transmitted multicast service.

5. The method according to claim 1, wherein the core network device comprises a broadcast/multicast service center (BM-SC), and wherein the access network device comprises a base station; and
  wherein transmitting the coverage requirement to the access network device comprises:
    transmitting, by the BM-SC via a mobility management entity and a Multimedia Broadcast Multicast Service (MBMS) coordination entity (MCE), the coverage requirement to the base station.

6. The method according to claim 1, wherein the core network device comprises a home subscriber server (HSS), and wherein the access network device comprises a base station; and
  wherein transmitting the coverage requirement to the access network device comprises:
    transmitting, by the HSS via a mobility management entity and a Multimedia Broadcast Multicast Service (MBMS) coordination entity (MCE), the coverage requirement to the base station.

7. A method, comprising:
  receiving, by an access network device, a coverage requirement transmitted by a core network device;
  determining, by the access network device according to the coverage requirement, a transmission parameter to be used to transmit a multicast service to a terminal device, wherein the transmission parameter corresponds to a quantity of retransmission times to be used to transmit the multicast service; and
  transmitting, by the access network device, the multicast service to the terminal device according to the transmission parameter.

8. The method according to claim 7, wherein the transmission parameter comprises:
  an index of a coverage level corresponding to the multicast service, wherein the coverage level corresponds to the quantity of retransmission times to be used to transmit the multicast service; or
  a quantity of retransmission times of the multicast service on a control channel of a physical layer or a shared channel of a physical layer.

9. The method according to claim 7, wherein the access network device comprises a base station; and
  wherein receiving, by the access network device, the coverage requirement comprises:
    receiving, by the access network device via a mobility management entity and an Multimedia Broadcast Multicast Service (MBMS) coordination entity (MCE), the coverage requirement from the core network device.

10. A system comprising:
  a core network device; and
  an access network device;
  wherein the core network device is configured to:
    determine a coverage requirement of a to-be-transmitted multicast service; and
    transmit the coverage requirement to the access network device, wherein the coverage requirement is usable for determining a transmission parameter to be used to transmit the to-be-transmitted multicast service to a terminal device; and
  wherein the access network device is configured to:
    receive the coverage requirement;
    determine, according to the coverage requirement, the transmission parameter, wherein the transmission parameter corresponds to a quantity of retransmission times to be used to transmit the to-be-transmitted multicast service; and transmit the to-be-transmitted multicast service to the terminal device according to the transmission parameter.

11. The system according to claim 10, wherein the transmission parameter comprises:

an index of a coverage level corresponding to the to-be-transmitted multicast service, wherein the coverage level corresponds to the quantity of retransmission times to be used to transmit the to-be-transmitted multicast service; or a quantity of retransmission times of the to-be-transmitted multicast service on a control channel or a physical layer or a shared channel of a physical layer.

12. The system according to claim 10, wherein the core network device comprises a broadcast/multicast service center (BM-SC); and wherein the core network device is further configured to determine the coverage requirement of the multicast service according to a correspondence, provided by a third-party server, between a service type of the to-be-transmitted multicast service and the coverage requirement of the to-be-transmitted multicast service.

13. The system according to claim 10, wherein the core network device comprises a broadcast/multicast service center (BM-SC); and wherein the core network device is configured to determine the coverage requirement of the to-be-transmitted multicast service according to a service type of the to-be-transmitted multicast service provided by a third-party server, and further according to a correspondence, preconfigured by the BM-SC, between the service type of the to-be-transmitted multicast service and the coverage requirement of the to-be-transmitted multicast service.

14. The system according to claim 10, wherein the core network device comprises a broadcast/multicast service center (BM-SC), and the access network device comprises a base station; and wherein the core network device is configured to transmit the coverage requirement to the base station via a mobility management entity and a Multimedia Broadcast Multicast Service (MBMS) coordination entity (MCE).

15. The system according to claim 10, wherein the core network device comprises a home subscriber server (HSS), and the access network device comprises a base station; and wherein the core network device is configured to transmit the coverage requirement to the base station via a mobility management entity and an MCE.

16. An access network device, comprising:

a transmitter;

a receiver, configured to receive a coverage requirement transmitted by a core network device;

a processor; and a non-transitory computer-readable storage medium storing a program to be executed by the processor, the program including instructions to:

determine, according to the coverage requirement received by the receiver, a transmission parameter to use to transmit a multicast service to a terminal device, wherein the transmission parameter corresponds to a quantity of retransmission times to be used to transmit the multicast service; and cause the transmitter to transmit the multicast service to the terminal device according to the transmission parameter determined by the processor.

17. The access network device according to claim 16, wherein the transmission parameter comprises:

an index of a coverage level corresponding to the multicast service, wherein the coverage level corresponds to the quantity of retransmission times to be used to transmit the multicast service; or a quantity of retransmission times of the multicast service on a control channel of a physical layer or a shared channel of a physical layer.

18. The access network device according to claim 16, wherein the access network device comprises a base station; and wherein the receiver is configured to receive, via a mobility management entity and a Multimedia Broadcast Multicast Service (MBMS) coordination entity (MCE), the coverage requirement from the core network device.

* * * * *